Patented Sept. 17, 1935

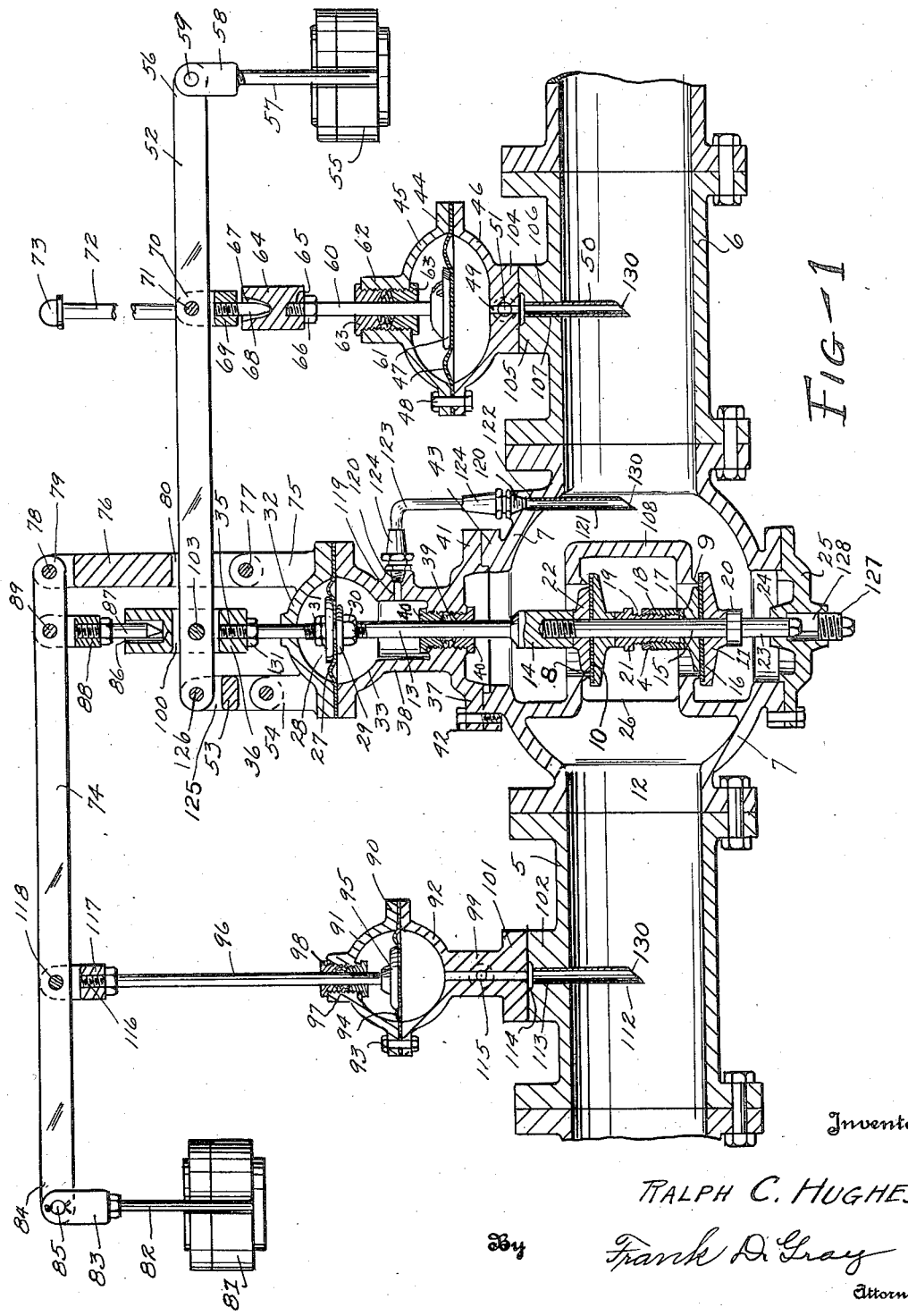

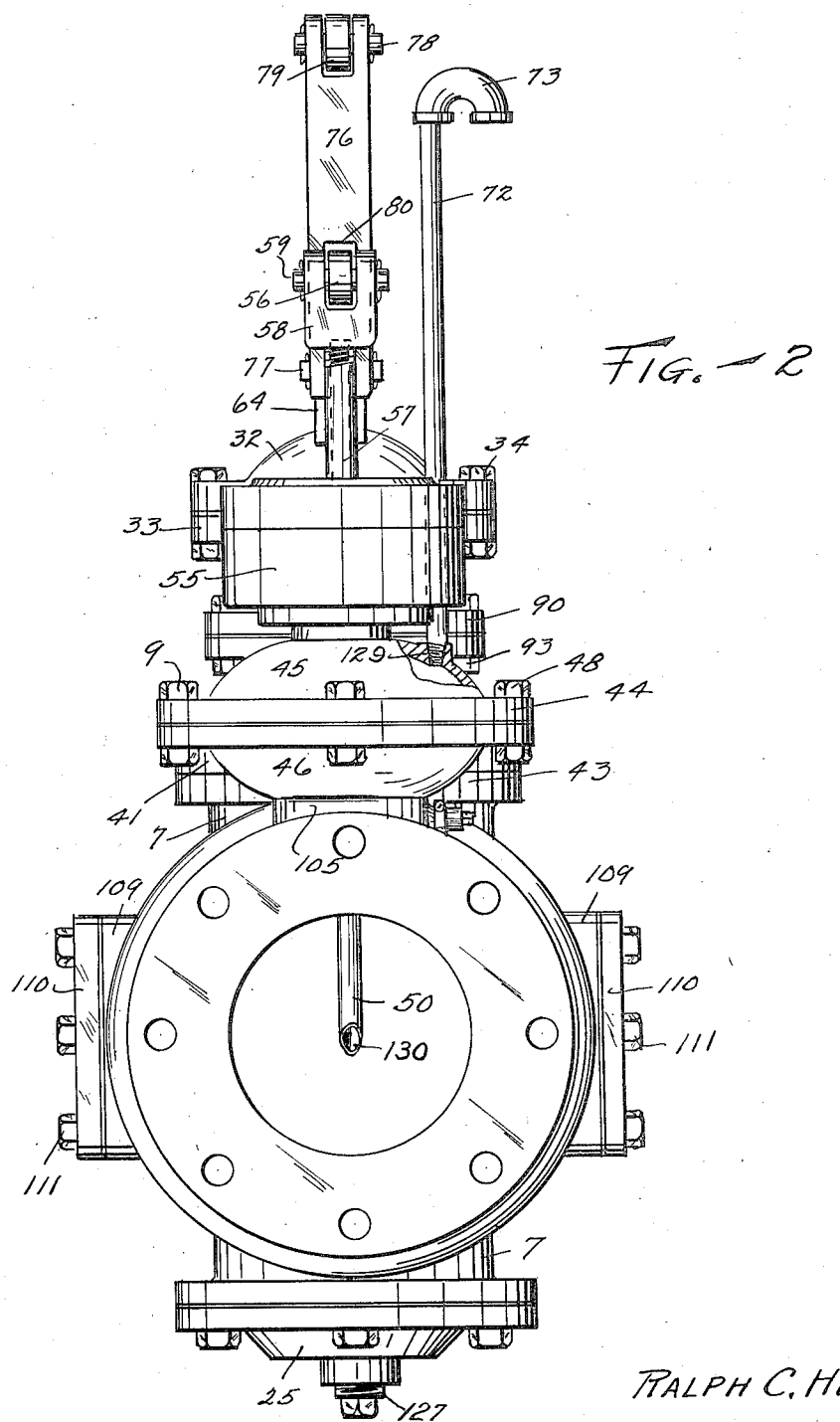

2,014,968

UNITED STATES PATENT OFFICE 2,014,968

PRESSURE REGULATOR CONTROL DEVICE

Ralph C. Hughes, Anderson, Ind., assignor to Reynolds Gas Regulator Co., Anderson, Ind., a corporation of Indiana Application January 26, 1932, Serial No. 588,886

3 Claims. (Cl. 50—16)

This invention relates to a pressure regulator device, and particularly to regulator control structure governed automatically by pressure responsive mechanism, operated by a plurality of factors all of which are responsive to pressure, and at spaced points in the high-pressure and low-pressure area, the final effective control between these areas being a resultant of the various factors, each having an element of regulation of the flow of fluid from the high-pressure to the low-pressure main.

It is a particular object of my invention to provide a combination of mechanical elements which together or separately, will serve to automatically control the more or less conventional reducing valve mounted between high-pressure supply and low-pressure demand mains. Such combination will be mounted upon these mains and upon the casing enclosing said reducing valve, and in such relation that the varying pressure in either of the mains or in said casing will vary the effective control of said valve.

It is a further object of my invention to provide a plurality of separate mechanical control members which while operating by mutual engagement of said members external of the mains, have each a pressure responsive means regulated by its own pressure relation controlled by the particular pressure existing in the main adjacent the responsive means for controlling the connected mechanical member. Such provision of the plurality of mechanical members for mutual control of the main reducing valve, may therefore, as will be later explained in this specification, not only be weighted separately as desired, but have as above stated, a related regulatory control of the said valve by a composite force made up of pressure factors exerted at spaced areas in either of the supply or demand mains, or by both.

The invention consists in the matters set forth hereinafter, and more particularly pointed out in the appended claims.

In the drawings, Figure 1 illustrates my invention applied to gas mains and showing a longitudinal, central vertical section of the reducing valve and casing of connected lines, with certain parts shown in elevation,— and Figure 2 is an end elevation looking from the low pressure side toward the valve.

The numeral 5 designates the high-pressure main and 6 a relatively low or outlet main connected by the valve casing 7 provided with the valve seats 8 and 9 with which cooperate the valves 10 and 11 designed to engage said seats to normally close in the conventional balanced relation, and receding therefrom to permit flow of a fluid from the inlet opening 12 in the casing 7 into the outlet main 6. The valves 10 and 11 are carried by the lower end of a stem extension 15 having a threaded upper end detachably secured in an axially screw-threaded enlargement 14 of a stem 13.

The lower valve member 11 is directly mounted on said extension 15 by resting upon an integral collar or shoulder 20 of said extension, and is provided with a facing 16 clamped on said member by a plate 17 encircling said extension. A corresponding plate 22 is positioned above a similar facing to clamp the latter against valve member 10. Between parts 10 and 17 are mounted relatively telescopic and threaded, adjustable sleeve members 18 and 19 which encircle the extension 15, to space such valve parts by relative rotation, the member 19 having a polygonal enlargement 21 at its top portion for rotation by suitable tool. A lock nut 4 is provided upon the male member 19.

All of said parts 10, 11, 16, 17, 18, 19 and 22 are axially mounted for movement on the extension 15, and are held between the parts 14 and 20. The valve members 10 and 11 are therefore adjustably spaced by said sleeve members 18 and 19, and relative rotation of parts 14 and 15 forces the former against the plate 22. This mounting of the valve members is substantially that illustrated in application for patent Serial No. 248,706 by Souders, et al., filed January 23, 1928, and now pending.

The lower end 23 of the extension 15 is guided in a boss 24 integral with the bottom cover plate 25. The casing 7 is also provided with a hand hole 26, normally closed, to permit access to the valve. A flexible diaphragm 27 is secured to the stem 13 by clamping plates 28 and 29 between a lower nut 30 and nuts 31 threaded on the stem above the plate 28.

The diaphragm 27 is clamped between the annular flanges of the two sections 32 and 33 of the diaphragm casing, which sections are bolted together, as shown at 34. The upper end of stem 13 is movable through the casing section 32 and is threaded at 35 to engage the link member 36 and is provided with a lock nut 131.

The lower section 33 of the diaphragm casing is integral with a detachable cover 37 for the valve casing 7, and an intermediate sleeve-like reduced portion 38 integral with such section and cover is provided, and between the cover and such intermediate portion a reduced throat 39 is formed for apertured guide plugs 40 to assist in guiding the stem 13 in its vertical movement. The cover flanges 41 are bolted at 42 to the flanges 43 of the casing 7.

Upon the outlet main 6, separated from but conveniently adjacent the main diaphragm 27, I have mounted an auxiliary diaphragm casing 44 comprising upper and lower sections 45 and 46 respectively, between whose annular flanges the diaphragm 47 is clamped, the sections being bolted together at 48. The lower section 46 communicates with the outlet line by the lower aperture 49 and a hollow tube 50 connected with said section 46 is inserted into the outlet main to furnish the diaphragm casing 44 with pressure responsive to pressures in the axial center of the outlet main. A needle valve 51 is provided for positively controlling flow through said aperture 49.

A lever 52 is pivotally connected at one end by the link 53 to a lug 54 integral with the upper section 32 of the diaphragm casing mounted directly above the valve casing 7. This lever extends parallel with the mains and is directed toward the outlet main, and above the diaphragm casing 44 and beyond the latter, and is provided with weights 55 suspended from the lever end 56 opposite the link 53, by the usual rod 57 from the fork 58 pivoted at 59.

Extending above the diaphragm 47 is a vertically movable rod 60 secured to a suitable plate 61 attached to the upper surface of the diaphragm 47 by appropriate means whereby said stem or rod 60 will be moved responsive to pressure beneath said diaphragm. The upper section 45 is provided with an internally threaded sleeve 62 integral with such section.

Within the sleeve 62 I have provided apertured guide plugs 63 for vertically guiding the stem 60 in its movement. Pivotal connection is made between the stem 60 and the lever 52 at a point intermediate the ends of such lever by providing a cylindrical block 64 mounted upon the stem by inserting the threaded end 65 of the latter in a threaded opening of such block, and providing a lock nut 66. The upper end of the block 64 has an axial socket 67 to receive loosely therein a downwardly extending pin 68 which has a threaded connection with a forked block 69 having the spaced lugs 70 apertured to receive the transverse pin 71 for pivoting the lever 52 on said block. The loose pin and socket connection of this structure provides ready means of detaching the lever from the stem 60, while affording positive connection of the parts while the lever is subjected to the downward force of the weight 55.

Since a stuffing box is provided by the guide plug construction 63, a breather pipe 72 is provided for the casing 44 to afford a vent for the latter above the diaphragm 47 and thereby avoid retarding the action of the diaphragm by air log in the upper section 45 that would otherwise result. The pipe 72 may extend from a threaded connection 129 to a suitable height and will ordinarily be provided at its upper end with a return bend 73 to avoid entrance into such pipe of any foreign matter such as water, falling downward, and even entering the casing and reaching the top of the diaphragm.

A second lever 74 is mounted on the main diaphragm casing and directed oppositely to the first lever 52, and substantially parallel with the latter but somewhat above it. A vertical pivot lug 75 is fixedly mounted on the casing section 32 and directly opposite the lug 54 upon which the lever 52 is pivoted. A vertical link 76 is pivoted to the lug 75 by a cross pin 77, and to the end 79 of the lever 74 by the pin 78.

The link 76 is bifurcated at its ends for the pivotal connections, and is provided with an intermediate slot 80 through which the lever bar 52 extends rather loosely to permit independent movements of the link and bar 52, as well as of the two bars 52 and 74. The lever 74 is urged downward on its pivot 78 by the weight 81 connected by rod 82 and fork 83 to the end 84 opposite said pivot, by the pin 85. The link 36 is provided at its upper end with an axial socket 86 to receive loosely therein a downwardly extending pin 87 having a threaded connection with a bifurcated block 88 provided with a transverse pin 89 for pivotal connection with the lever 74 at a point slightly spaced from the pin 78 and the lever end 79.

The transverse aperture 100 is in substantial alinement with the slot 80 in link 76, but the lever bar 52 is pivotally connected to the link 36 by a transverse pin 103 inserted through the walls of the aperture in the link and lever bar. The pin and socket connection afforded by parts 86 and 87 affords the same advantage, as that resulting from the parts 67 and 68 in connection with the lever 52, as explained above. On the inlet side of the valve casing 7 opposite the casing 44, and corresponding to the latter, I have mounted a diaphragm casing 90 made up of flanged sections 91 and 92 secured detachably together by bolts 93; and secured therein for response to pressure in the inlet main 5, a flexible diaphragm 94 to the upper surface of which, by a plate 95, an upwardly extending stem 96 is attached, and is guided for vertical movement in a central opening 97 in the section 91, by apertured plugs and stuffing box structure 98 substantially similar to that used for guiding stem 60 in the section 45. Casing 90 is detachable from inlet main 5.

Integral with the lower section 92 an axially apertured reduced portion 99 leads downwardly to an annular base plate 101 which is detachable from a corresponding flanged base portion 102 integral with the main 5.

In mounting the diaphragm casing 44 upon the outlet main 6, the lower section 46 is provided with an integral cylindrical base portion 104 which will be detachably connected to an annular base portion 105 integral with the outlet section, in proper position thereon to cause the aperture 49 to register with the tube 50 above described. This tube 50 has an upper end 106 inserted in an axial opening 107 in the annulus 105, and said opening is connected with a shallow enlarged opening on the upper surface of the annulus where connection is made with the aperture 49.

In registry with the partition wall 108 within the valve casing 7, there are provided hand openings 26 on the sides of said casing and the latter provided with suitable annular flanges 109 integral with the casing and providing an outer surface in a common plane upon which cover plates 110 may be detachably secured by bolts 111. This construction provides a very practicable manual entrance into the valve casing on either side for adjustment and repair.

A tube 112 connected with tubular actuating means is inserted into the inlet main 5 through an opening 113 axial of the base portion 102, an enlarged shallow opening being provided and designated 114, similar to opening connected with the opening 107. A needle valve 115 positively controls the aperture in the reduced portion 99. The reduced portion 99 is sufficiently lengthened to raise the casing 90 above the level of the casing 44 to correspond with the relative difference between the heights of the levers 74 and 52. The stem 96 has an upper end externally threaded to be adjustably inserted in an axial opening 116 in a block 117 having a bifurcated upper end to which the lever 74 is pivoted by a cross pin 118 intermediate the pivots 85 and 89. The lever 74 has effective connection therefore, with the main stem 13, and is itself influenced by diaphragms 47 and 94 as well as by the main diaphragm 27.

The sleeve portion 98 is provided with a lateral aperture 119 extending through the wall of the sleeve, and having a slightly enlarged and internally threaded portion 120 for receiving therein the externally threaded end of an axially apertured fitting 124 permitting detachable connection with the portion 120. A similar fitting 124 has the external end mounted upon the end of a connecting tube 123, and having the threaded means for connection with the opening 122 through the wall of the casing 7 vertically on the outlet end of the casing, and thereby providing means for mounting another hollow tube 121 extending through the opening 122 into the casing 7 in alinement with the inlet and outlet mains connected with said casing 7.

The end of the bar 52 remote from the weight 55 is pivoted to the lugs 125 of the link 53 by the cross pin 126, and the two lever bars 52 and 74 are mutually connected by the parts 86, 87, 88, 89, 100 and 103. The two weights 55 and 81 have therefore a common control influence on the main valve stem 13, and thence on the main reduction valve 10—11. The diaphragms 94, 47 and 27, are each subject to pressure in the corresponding central portions of the inlet and outlet mains, as well as at the outlet opening in the valve casing, respectively, so that these three factors of pressure control are utilized in regulating the main reduction valve.

It will be evident that the cooperation of the two levers 52 and 74 each of which is pivoted upon separate lugs 54 and 75 integral with the identical casing section 32 directly above the main reducing valve between the inlet and outlet mains, will serve as an especially sensitive regulator for such main valve, and that the provision of the tubes 50, 112 and 121 will vary such control in response to the several pressures exerted in the two mains and in the outlet openings in the valve casing itself.

The lower movement of the extension 15 is illustrated as limited by a closure in the cover 25 and which may be a threaded plug 127 which may be adjusted by a wrench in the central opening 128 into which the lower end 23 moves when the valve opens. The open sockets 67 and 86 obviously permit ready disconnection of the bar 52 from its downward pressure upon the diaphragm 47, and of the bar 74 from direct pressure upon the stem 13 and the main valve. The two bars have a common influence due to their weights, upon the valve stem 13, by reason of the pivoting of the bar 52 at 103 on the part 36. This is due especially to the distance between the pivots 78 and 89 being substantially identical with the distance between the pivots 103 and 126.

The provision of the slot 80 in the link 76 permits loose motion between the bar 52 and said link, so that the only connection between the two bars is afforded by the pin 103. The arrangement of these links 36 and 76 is especially desirable in affording the desired mutual effect of the weighted bars upon the valve stem 13, although such bars are substantially parallel and lie in a substantially common plane with the axis of the mains 5 and 6 and of the valve casing 7. It results therefore, that these bars 52 and 74, though responsive to the pressure in the outlet and inlet mains respectively, will have a connection with the valve stem by a common pivot and do not require lateral extension of either of them from the axis of the mains.

In operation, it is evident that the valve 10—11 will be responsive to either or both of the levers 52 and 74 whose weights may be adjusted as desired, and that the main diaphragm 27 is directly responsive to the pressure in the outlet opening of the main casing exerted beneath said diaphragm in the lower chamber 33. It is also evident that the diaphragm 47 responsive to pressure in the outlet main, may actuate the valve stem 13 without positively moving the bar 74.

Viewed in plan, the two levers 52 and 74 have the appearance of a continuous edge or line which extends in alinement with the axes of the inlet and outlet mains, providing therefore, an actuating structure for the main valve 10—11 which does not require mounting of any part of it extending at all oblique to the mains or central valve casing. This result is especially desirable in not laterally extending the outline of the operating mechanism. This compact arrangement of the lever means all of which is connected for automatic actuation of the main valve stem, and thereby actuating the main valve in response to varying pressures within the above mentioned spaced points, is further advantageous in making inspection and repair of the several parts readily facilitated while the entire mechanism may be readily detached from the casing and the two mains.

By removal of the plates 110 the main valve itself 10—11 may be examined or repaired, and the engineer will not be hindered in any way by interference by overhanging parts of the regulating structure, as has heretofore been the disadvantage encountered when the connected levers were either or both of them oblique to the axis of the line. Also, when the pin 87 is lifted slightly, the single bar 52 is substantially disconnected from relation with the bar 74, since the link member 36 will serve as a mere serviceable connection between the lever 52 and the main valve stem 13, the slot 80 permitting such independent movement of the parts 52 and 74, should it be desired to control the main valve from the pressure in the outlet side only.

The tubular stems 50, 112 and 121 have their inner ends presented in a plane oblique to the axes thereof, as at 130, and have their faces directed toward the direction of flow of the fluid being regulated—i. e. facing a direction identical with the flow of fluid in the mains and casing.

It will be evident that increased rate of flow through the outlet opening of the casing 7 will reduce the pressure at the point beneath the diaphragm 27, and through the stem 121 and the tube 123 will likewise reduce the pressure in the chamber 33 beneath the diaphragm 27 which will have the obvious effect of reducing the resistance to the latter, so that the weights 55 and 81 will force the valve stem 13 downward and open the valve 10—11 further until increase in flow of fluid from the inlet main will meet the demand required. My novel arrangement of the two lever bars, each of which may be weighted as desired, provides direct and mutual response of the position of these valve elements to the fluid pressure at the ends 130 of the three tubular stems 50, 112 and 121. Not only does the pressure at these three points directly control the main valve, but the rate of flow at such points have their effective influence by reason of their well-known effect upon the corresponding pressures.

It will be appreciated that a great advantage results from these control diaphragms sensitive to their corresponding pressures and operating together as they do in regulating the main valve, and at the same time permits provision of all the external control mechanism within the outline of the mains and connected valve casing.

It is to be understood that my invention is not restricted to the particular apparatus disclosed and described. While for purposes of illustration, a particular construction of balanced valve is shown in the drawings, other form of valves, though preferably of the balanced type, can be readily used in connection with my regulating mechanism.

What I claim as my invention is:—

1. The combination of high and low pressure mains, a valve casing and a control valve therein for regulating passage of fluid between said mains, said valve having an actuating stem, a diaphragm casing, and a diaphragm for actuating said stem, of two spaced links pivoted independently upon the common diaphragm casing, two weighted levers pivoted independently upon said links and extending in the common longitudinal outline of said mains, one of said links having a slot therein through which the lever pivoted on the other link extends loosely, and common means for providing pivotal connection of both levers with said valve stem.

2. The combination of high and low pressure mains, a valve casing and a control valve therein for regulating passage of fluid between said mains, said valve having an actuating stem, a diaphragm casing, and a diaphragm for actuating said stem, of two spaced links pivoted independently upon the common diaphragm casing, weighted levers pivoted at one end on the respective links and extending in alinement in superposed and parallel relation within the longitudinal outline of said mains, one of said links having a slot therein through which the lever on the other link extends loosely, said levers being directed oppositely from said diaphragm casing, diaphragms and casings therefor mounted on the inlet and outlet mains and having mechanical connection with the respective weighted levers, means communicating with the respective mains for said last-named diaphragms to influence the respective levers in response to pressure in said mains, and common means for providing pivotal connection of both levers with said valve stem.

3. The combination of high and low pressure mains, a valve casing and a control valve therein for regulating passage of fluid between said mains, said valve having an actuating stem, a diaphragm casing, and a diaphragm for actuating said stem, of two spaced links pivoted independently upon the common diaphragm casing, weighted levers pivoted at one end on the respective links and extending in superposed and parallel relation within the longitudinal outline of said mains, one of said links having a slot therein through which the lever on the other link extends loosely, diaphragms and casings therefor mounted on the inlet and outlet mains and having mechanical connection with the respective weighted levers, tubular means extending within the wall of and into the outlet side of said valve casing communicating with the lower chamber of said common diaphragm casing whereby said stem actuating diaphragm may respond to the pressure in said outlet end of the valve casing, tubular stems connecting said diaphragm casings on said mains with the interior of said mains respectively, to actuate said diaphragms in the latter casings and thereby said levers, and common means for providing pivotal connection of both levers with said valve stem.

RALPH C. HUGHES.